United States Patent [19]

Best et al.

[11] Patent Number: 4,766,100

[45] Date of Patent: * Aug. 23, 1988

[54] POLYMERIZATION CATALYST, PRODUCTION AND USE (P-1063)

[75] Inventors: Steven A. Best; Bradley P. Etherton, both of Houston; Malcolm J. Kaus, Humble, all of Tex.

[73] Assignee: Exxon Research & Engineering Co., Florham Park, N.J.

[*] Notice: The portion of the term of this patent subsequent to Jan. 14, 2003 has been disclaimed.

[21] Appl. No.: 752,422

[22] Filed: Jul. 5, 1985

Related U.S. Application Data

[63] Continuation-in-part of Ser. No. 637,985, Aug. 6, 1984, abandoned.

[51] Int. Cl.$^4$ ............................ C08F 4/02; C08F 4/64
[52] U.S. Cl. .................................... 502/115; 502/116; 502/119; 526/129
[58] Field of Search ............... 502/119, 114, 115, 116

[56] References Cited

U.S. PATENT DOCUMENTS

| | | | |
|---|---|---|---|
| 3,644,318 | 2/1972 | Diedrich et al. | 526/124 |
| 4,451,574 | 5/1984 | Johnson | 526/129 |
| 4,458,058 | 7/1984 | Dambro | 526/129 |
| 4,564,606 | 1/1986 | Best | 502/117 |
| 4,565,797 | 1/1986 | Etherton et al. | 502/116 |

FOREIGN PATENT DOCUMENTS

| | | | |
|---|---|---|---|
| 44665 | 1/1982 | European Pat. Off. | 526/129 |
| 1264416 | 2/1972 | United Kingdom | 526/124 |
| 2101610 | 1/1983 | United Kingdom | 526/129 |

*Primary Examiner*—Edward J. Smith
*Attorney, Agent, or Firm*—J. F. Hunt

[57] ABSTRACT

Ethylene and alpha-olefins are homopolymerized or copolymerized with another olefin monomer in the presence of a catalyst system comprising an organo metal cocatalyst and a titanium-containing catalyst component, said titanium-containing catalyst component being obtained by reacting together a porous particulate material, an organic magnesium compound, an oxygen-containing compound, an acyl halide, titanium tetrachloride and $Cl_2$, $Br_2$ or an interhalogen compound and treating the solids with an organometallic compound of a Group IIa, IIb or IIIa metal.

36 Claims, No Drawings

POLYMERIZATION CATALYST, PRODUCTION AND USE (P-1063)

This application is a continuation-in-part of U.S. patent application Ser. No. 637,985 filed August 6, 1984, now abandoned.

BACKGROUND OF THE INVENTION

This invention relates to a novel catalyst component to be employed with a cocatalyst for use in the polymerization of olefins to polyolefins such as polyethylene, polypropylene and the like, or copolymers such as ethylene copolymers with other alpha-olefins and diolefins, which catalyst component imparts unusually high activity and improved comonomer response and the polymer product obtained has a desirable bulk density. The catalyst component is especially useful for the production of linear polyethylenes such as high density and linear low density polyethylene. The polymer product obtained evidences an important balance of polymer properties, for example, the catalyst system obtains a polymer with a narrow molecular weight distribution and an improved balance in polymer product machine direction tear strength and transverse direction tear strength. As a result, the film blown from resin produced from the catalyst manifests an overall high strength.

The catalyst component comprises a solid reaction product obtained by contacting a solid, particulate, porous support material such as, for example, silica, alumina, magnesia or mixtures thereof, for example, silica-alumina, in stages with an acyl halide, a transition metal compound, an organometallic composition treated with an alcohol, a halogen containing compound, halogen or interhalogen and prereducing the solid in the presence of an organoaluminum compound. The novel catalyst component, which when used with an aluminum alkyl cocatalyst, provides the novel catalyst system of this invention which can be usefully employed for the polymerization of olefins.

The catalyst system can be employed in slurry, single-phase melt, solution or gas-phase polymerization processes and is particularly effective for the production of linear polyethylenes such as high density polyethylene and linear low density polyethylene.

Recently, interest has arisen in the use of magnesium-titanium complex catalyst components for the polymerization of olefins. For example, European Patent Application No. 27733, published April 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica, but otherwise the disclosure is similar to the above-discussed European patent application.

U.S. Pat. No. 4,250,288 discloses a catalyst which is the reaction product of a transition metal compound, an organomagnesium component, and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. No. 4,004,071 and U.S. Pat. No. 4,276,191.

U.S. Pat. No. 4,173,547 and U.S. Pat. No. 4,263,171, respectively disclose a catalyst component comprising silica, an aluminum-type titanium trichloride and dibutyl magnesium and a catalyst component comprising a magnesium alkylaluminum alkyl complex plus titanium halide on a silica support.

The use of chlorine gas in polymerization processes is taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a cocatalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like.

Each of U.S. Pat. Nos. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the catalyst of this invention.

In British No. 2,101,610 silica is treated with a magnesium alkyl, an alcohol, benzoyl chloride and $TiCl_4$. In each of Japanese Kokai Nos. 56-098206 and 57-070107 acyl halides are employed during the preparation of titanium supported catalysts.

The catalyst systems comprising magnesium alkyls and titanium compounds, although generally useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, do not show an extremely high catalytic activity and obtain polymer product whose film properties are unbalanced under anisotropic conditions.

In U.S. Pat. No. 4,451,574 issued May 29, 1984, a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer poduct.

In our copending application Ser. No. 638,167 filed Aug. 6, 1984, now U.S. Pat. No. 4,564,606, we disclosed a transition metal supported catalyst component obtained by contacting an inert solid support with (a) the reaction product of a dialkyl magnesium compound and an alcohol, (b) an acyl halide, (c) TiCl$_4$, and (d) Cl$_2$. In copending application Ser. No. 637,641 filed Aug. 3, 1984, now U.S. Pat. No. 4,565,797, there is disclosed a transition metal supported catalyst component obtained by contacting an inert solid support with (a) the reaction product of a dialkyl magnesium compound and an oxygen-containing compound, (b) a transition metal halide such as TiCl$_4$, (c) Cl$_2$ and treating the resultant solid with an organometallic compound of a Group IIa, IIb or IIIa metal.

In accordance with this invention catalyst combinations have been found which have very high catalytic activities and excellent hydrogen responsiveness for the control of molecular weight, excellent comonomer response and obtain polymer product with greatly improved film properties. The resins exhibit excellent melt strength along with a decrease in extrusion power consumption, resulting in increased bubble stability in blown film production. In addition, the resins exhibit an increase in extrusion rates. The invention is distinguished over our copending application in that the catalyst of this invention unexpectedly obtains an improvement in catalytic activity and the polymers produced therefrom have unexpectedly improved bulk density.

The new catalyst components of this invention are obtained by contacting an organometallic compound, an oxygen-containing compound such as a ketone, aldehyde, siloxane or alcohol, an acyl halide, a transition metal compound, a halogen or interhalogen compound in the presence of a oxide support and treating the obtained solid with an organometallic compound of a Group IIa, IIb or IIIa metal such as, for example, an aluminum alkyl. The catalyst system comprising the transition metal-containing catalyst component and an organoaluminum cocatalyst is advantageously employed in a gas phase ethylene polymerization process since there is a decrease in reactor fouling as generally compared with catalytic prior art ethylene gas phase polymerization processes thereby resulting in less frequent reactor shut downs for cleaning purposes.

SUMMARY OF THE INVENTION

In accordance with the objectives of this invention there is provided a transition metal-containing catalyst component for the polymerization of alpha-olefins comprising a solid reaction product obtained by treating an inert solid support material in an inert solvent with (A) an organometallic compound of a Group IIa, IIb or IIIa metal of the Periodic Table wherein all the metal valencies are satisfied with a hydrocarbon or substituted hydrocarbon group, (B) an oxygen-containing compound selected from ketones, aldehydes, alcohols, siloxanes or mixtures thereof, (C) an acyl halide, (D) at least one transition metal compound of a Group IVb, Vb, VIb or VIII metal of the Periodic Table, (E) Cl$_2$, Br$_2$ or an interhalogen, and (F) treating the transition metal-containing product with an organometallic compound of a Group IIa, IIb, or IIIa metal, with the proviso that the (A) and (B) ingredients can be employed (i) simultaneously, (ii) as the reaction product of (A) and (B), or (iii) treatment with (B) immediately preceeds treatment with (A).

The solid transition metal-containing catalyst component when employed in combination with a cocatalyst such as an alkyl aluminum cocatalyst provides a catalyst system which demonstrates a number of unique properties that are of great importance in olefin polymerization technology such as, for example, extremely high catalytic activity, the ability to control the molecular weight during the polymerization reaction as a result of the improved responsiveness to hydrogen, improved comonomer response, increased polymer yield, and reduced reactor fouling. A particular advantage of the instant invention is the ability of catalytically producing polymer product having improved bulk density.

In a preferred embodiment of the invention the (A) organometallic compound is a dihydrocarbyl magnesium compound represented by R$^1$MgR$^2$ wherein R$^1$ and R$^2$ which can be the same or different are selected from alkyl groups, aryl groups, cycloalkyl groups, aralkyl groups, alkadienyl groups or alkenyl groups having from 1 to 20 carbon atoms, the (B) oxygen-containing compounds are selected from alcohols and ketones represented by the formula R$^3$OH and R$^4$COR$^5$ wherein R$^3$ and each of R$^4$ and R$^5$ which may be the same or different can be an alkyl group, aryl group, cycloalkyl group, aralkyl group, alkadienyl group or alkenyl group having from 1 to 20 carbon atoms, the (C) acyl halide is represented by the formula R$^6$COX wherein R$^6$ can be a C$_1$–C$_{20}$ alkyl group, cycloalkyl group or aryl group and X is halogen, the (D) transition metal compound is preferably a transition metal compound or combination of transition metal compounds represented by the formulas TrX''$_{4-q}$(OR$^8$)$_q$, TrX''$_{4-q}$R$_q^9$, VO(OR$^8$)$_3$ and VOX''$_3$ wherein Tr is a transition metal of Groups IVb, Vb, VIb, and VIII and preferably titanium, vanadium or zirconium, R$^8$ is an alkyl group, aryl group, aralkyl group, or substituted aralkyl group having from 1 to 20 carbon atoms and 1,3-cyclopentadienyls, X'' is halogen and q is zero or a number less than or equal to 4, and R$^9$ is an alkyl group, aryl group or aralkyl group having from 1–20 carbon atoms or a 1,3-cyclopentadienyl, the (E) halogen is Cl$_2$ and the (F) organometallic compound is an aluminum alkyl represented by R$_n^7$AlX'$_{3-n}$ wherein X' is a halogen, or hydride and R$^7$ is a hydrocarbon group selected from alkyl group, aryl group, cycloalkyl group, aralkyl group, alkadienyl group or alkenyl group having from 1 to 20 carbon atoms and $1 \leq n \leq 3$.

All references to the Periodic Table are to the Periodic Table of the Elements printed on page B-3 of the 56th Edition of Handbook of Chemistry and Physics, CRC Press (1975).

The catalyst component forming ingredients can be added in any order to the support material (with the exception of (F) which must be last) in preparing the transition metal-containing catalyst component, for example:

(B), (A), (C), (D), (E) and (F)
(A+B), (C), (D), (E) and (F)
(A&B), (C), (D), (E) and (F)
(E), (B), (A), (C), (D) and (F)
(E), (A+B), (C), (D) and (F)
(E), (A&B), (C), (D) and (F)
(C), (B), (A), (E), (D) and (F)
(C), (A+B), (E), (D) and (F)
(C), (A&B), (E), (D) and (F)
(D), (C), (B), (A), (E) and (F)
(D), (C), (A+B), (E) and (F)
(D), (C), (A&B), (E) and (F)
(D), (E), (B), (A), (C) and (F)
(D), (E), (A+B), (C) and (F)
(D), (E), (A&B), (C) and (F)
(D), (B), (A), (C), (E) and (F)
(D), (A+B), (C), (E) and (F)

(D), (A&B), (C), (E) and (F)
(D) (B), (A), (E), (C) and (F)
(D), (A+B), (E), (C) and (F)
(D), (A&B), (E), (C) and (F)
(B), (A), (E), (D), (C) and (F)
(B+A), (E), (D), (C) and (F)
(B&A), (E), (D), (C) and (F)
(B), (A), (C), (E), (D), and (F)
(B+A), (C), (E), (D), and (F)
(B&A), (C), (E), (D), and (F)
(B), (A), (E), (C), (D), and (F)
(B+A), (E), (C), (D), and (F)
(B&A), (E), (C), (D), and (F)

and the like. In the above, (A+B) represents the reaction product of (A) and (B) and (A&B) represents the simultaneous addition of (A) and (B) to the reacting system.

Of the possible order of additions the preferred are (A+B), (C), (D), (E) and (F); (E), (A+B), (C), (D) and (F); (A+B), (E), (C), (D), and (F); or (C), (A+B), (E), (D) and (F). More preferred are (E), (A+B), (C), (D) and (F); (A+B), (E), (C), (D), and (F); or (A+B), (C), (D), (E) and (F). The transition metal-containing catalyst component especially preferred is prepared by first treating the inert solid support with (E) Cl$_2$, Br$_2$ or an interhalogen or mixtures thereof followed by treatment with the reaction product of (A) the organometallic compound with (B) the oxygen-containing compound and thereafter treating the solid with the (C) acyl halide followed by treatment with the (D) transition metal compound and prereducing with (F).

In a second embodiment of this invention there is provided a catalyst system comprising the transition metal-containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalysts.

The catalyst system can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene, hexene, butadiene, 1,4-pentadiene and the like, so as to form copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprise the solid reaction product obtained by contacting a solid support material with (A) an organometallic composition, (B) an oxygen-containing compound, (C) an acyl halide, (D) at least one transition metal compound, (E) halogen or interhalogen compound which is treated with (F) an organometallic compound of a Group IIa, IIb, IIIa metal, with the proviso that the (A) and (B) ingredients can be added to the inert solid (i) simulaneously, (ii) as the reaction product of (A) and (B), or (iii) treatment with (B) immediately precedes treatment with (A).

The transition metal-containing catalyst component of this invention is preferably obtained by treating the inert solic support material in an inert solvent in the steps selected from the group consisting of (a) first treating with ingredient (E) followed by sequential treatment with ingredients (A), (B), (C), (D), and (F), (b) first treating with ingredients (A) and (B) followed by the sequential treatment with ingredients (C), (D), (E), and (F), or (c) first treating with ingredient (C) followed by the sequential treatment with ingredients (A) and (B), (E), (D), and (F)

(d) first treating with ingredients (B) and (A) followed by the sequential treatment with ingredients (E), (C), (D), and (F)

with the further proviso that the (A) and (B) ingredients can be added (i) simultaneously, (ii) as the reaction product of (A) and (B), or (iii) treatment with (B) immediately precedes treatment with (A).

Preferably, the transition metal-containing catalyst component of this invention is obtained by (I) treating the inert solid support material in an inert solvent with ingredient (E) followed by sequential treatment with ingredients (A), (B), (C), (D), and (F) and that the (A) and (B) ingredients can be added (i) simultaneously, (ii) as the reaction product of (A) and (B), or (iii) treatment with (B) immediately precedes treatment with (A); or (II) wherein the solid reaction product is obtained by treating inert solid support material in an inert solvent with ingredients (A) and (B), followed by sequential treatmen with ingredients (C), (D), (E), and (F) and with the further proviso that the (A) and (B) ingredients can be added to the inert solid (i) simultaneously, (ii) as the reaction product of (A) and (B), or (iii) treatment of the inert solid with (B) immediately precedes treatment with (A). The method (I) is especially preferred.

According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, zirconia, thoria, magnesia, and titania. Preferably the support material is a Group IIa, IIIa, IVa and IVb metal oxide in finely divided form.

Suitable inorganic oxide materials which are desirably employed in accordance with this invention include Group IIa, IIIa, or IVa or IVb metal oxides such as silica, alumina, and silica-alumina and mixtures thereof. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, such as trimethylchlorisilane, dimethyldichlorosilane, silylamines, such as hexamethyldisilazane and dimethylaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the inert hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but non-limiting examples of magnesium compounds which may be suitably employed in accordance with the invention are dialkylmagnesium such as diethylmagnesium, dipropylmagnesium, di-isopropylmagnesium, di-n-butylmagnesium, di-isobutylmagnesium, diamylmagnesium, di-n-octylmagnesium, di-n-hexylmagnesium, di-n-decylmagnesium, and di-n-dodecylmagnesium; dicycloalkylmagnesiums, such as dicyclohexylmagnesium; diaryl magnesiums such as dibenzylmagnesium, ditolylmagnesium and dixylylmagnesium and the like.

Preferably the organomagnesium compounds will have from 1 to 6 carbon atoms and most preferably $R_1$ and $R_2$ are different. Illustrative examples of the preferred magnesium compounds are are ethyl-n-propylmagnesium, ethyl-n-butylmagnesium, amyl-n-hexylmagnesium, n-butyl-s-butylmagnesium, n-butyl-n-octylmagnesium, and the like. Mixtures of hydrocarbyl magnesium compounds may be suitably employed such as for example di-n-butylmagnesium and ethyl-n-butylmagnesium.

The magnesium hydrocarbyl compounds are generally obtained from commercial sources as mixtures of the magnesium hydrocarbon compounds with a minor amount of aluminum hydrocarbyl compound. The minor amount of aluminum hydrocarbyl is present in order to facilitate solublization and/or reduce the viscosity of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylene, etc.

The organomagnesium complex with a minor amount of aluminum alkyl can be represented by the formula $(R^1MgR^2)_p(R_3{}^{10}Al)_s$. $R^1$ and $R^2$ are defined as above, $R^{10}$ is defined as $R^1$ and $R^2$ and p is greater than 0. The ratio of $s/s+p$ is from 0 to 1, preferably from 0 to about 0.7 and most desirably from about 0 to 0.1.

Illustrative examples of the organomagnesium-organoaluminum complexes are $[(n-C_4H_9)(C_2H_5)Mg][(C_2H_5)_3Al]_{0.02}$, $[(n-C_4H_9)_2Mg][(C_2H_5)_3Al]_{0.013}$, $[(n-C_4H_9)_2Mg][(C_2H_5)_3Al]_{2.0}$ and $[(n-C_6H_{13})_2Mg][(C_2H_5)_3Al]_{0.01}$. A suitable magnesium-aluminum complex is Magala ® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen-containing compounds which may be usefully employed in accordance with this invention are alcohols, aldehydes, siloxanes and ketones. Preferably the oxygen-containing compounds are selected from alcohols and ketones represented by the formulas $R^3OH$ and $R^4COR^5$ wherein $R^3$ and each of $R^4$ and $R^5$, which may be the same or different, can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms.

Illustrative, but non-limiting examples of alcohols, which may be usefully employed in accordance with this invention are alkyl alcohols such as ethanol, 1-propanol, 2-propanol, 1-butanol, 2-butanol, t-butanol, 1-hexanol, 2-ethyl-1-hexanol, 1-decanol; cyloalkyl alcohols such as cyclobutanol, cyclohexanol; aryl alcohols, such as phenol, 1-naphthol, 2-naphthol; aralkyl alcohols such as benzylalcohol, p-cresol, m-cresol; alkenyl alcohols such as allylalcohol, crotylalcohol, 3-butene-1-ol; and alkadienyl alcohols such as 2,4-hexadiene-1-ol. The most preferred alcohol is 1-butanol.

The ketones will preferably have from 3 to 11 carbon atoms. Illustrative, but non-limiting, ketones are alkyl ketones such as acetone, 3-pentanone, 4-heptanone, methylethylketone, methylbutylketone; cycloalkyl ketones such as cyclohexanone, cyclopentanone, 2-methylcyclohexanone; aryl ketones such as benzophenone, acetophenone, propiophenone; alkenyl ketones such as methylvinylketone and methylallylketone. The most preferred ketone is acetone.

Illustrative, but non-limiting, aldehydes which can be usefully employed in the preparation of the organomagnesium compound include alkylaldehydes such as formaldehyde, acetaldehyde, propionaldehyde, butanal, pentanal, hexanal, heptanal, octanal, 2-methylpropanal, 3-methylbutanal; aryl aldehydes such as benzaldehyde; alkenyl aldehydes such as acrolein, crotonaldehyde; aralkyl aldehydes such as phenylacetaldehyde, o-tolualdehyde, m-tolualdehyde, p-tolualdehyde. The most preferred aldehydes are acetaldehyde and formaldehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosiloxanes, polymethylethylsiloxanes, polymethloctylsiloxanes, and polyphenylhydrosiloxanes.

The preferred acyl halides can be represented by the formula $R^6COX$ wherein $R^6$ is a hydrocarbyl group containing 1 to 20 carbon atoms. $R^6$ can be an alkyl group, aryl group, aralkyl group, cycloalkyl group, alkadienyl group or alkenyl group and X is a halogen. The preferred halogen is chlorine. More preferably $R^6$ is an alkyl group having 1 to 6 carbon atoms or a phenyl or alkyl phenyl group having 6 to 10 carbon atoms. Most preferably $R^6$ is a methyl or phenyl group and X is chlorine.

Illustrative, but non-limiting, examples of the acyl halides which can be usefully employed in accordance with the invention are, alkyl acyl halides such as acetylchloride, propanoylchloride, butyrylchloride, butyrylbromide, isobutyrylchloride; aryl acyl halides such as benzoylchloride, 1-naphthoylchloride, 2-naphthoylchloride; cycloalkyl acyl halides such as cyclopentane carbonylchloride, cyclohexane carbonylchloride; aralkyl acyl halides such as p-toluoylchloride, m-toluoylchloride; alkenyl acyl halides such as acryloylchloride, 6-heptenoylchloride, crotonoylchloride. Acid chlorides based on polyacids may also usefully be employed such as, for example, dodecanedioyl, succinyl chloride, comphoryl chloride, terephthaloyl chloride and the like. The preferred acid halides are acetyl chloride, benzoyl chloride, and p-methylbenzoyl chloride.

The transition metal compounds of a Group IVb, Vb, VIb or VIII metal which can be usefully employed in the preparation of the transition metal-containing catalyst component of this invention are well known in the art. The transition metals which can be employed in accordance with this invention may be represented by the formulas $TrX'_{4-q}(OR^8)_q$, $TrX'_{4-q}R_q^9$, $VOX'_3$ and $VO(OR^8)_3$. Tr is a Group IVb, Vb, VIb, and VIII metal, preferably Group IVb and Vb metals and preferably titanium, vanadium or zirconium, q is 0 or a number equal to or less than 4, X' is halogen and $R^8$ is an alkyl group, aryl group or cycloalkyl group having from 1 to 20 carbon atoms and $R^9$ is an alkyl group, aryl group, aralkyl group, substituted aralkyl group, 1,3-cyclopentadienyls and the like. The aryl, aralkyls and substituted aralkyls contain from 1 to 20 carbon atoms preferably 1 to 10 carbon atoms. When the transition metal compound contains a hydrocarbyl group, $R^9$, being an alkyl, cycloalkyl, aryl, or aralkyl group, the hydrocarbyl group will preferably not contain a H atom in the position beta to the metal-carbon bond. Illustrative, but non-limiting, examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of the transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The halogens (E) which can be suitably employed in accordance with this invention are $Cl_2$, $Br_2$, $I_2$ and mixtures thereof. Illustrative interhalogen compounds are ClF, $ClF_3$, BrF, $BrF_3$, $BrF_5$, ICl, $ICl_3$ and IBr. The preferred halogens are $Cl_2$ and $Br_2$. The preferred interhalogens contain Br or Cl.

The transition metal-containing catalyst solid is treated with an organometallic compound of a Group IIa, IIb or IIIa metal. Preferably the organometallic compound employed in the treatment step (F) is an aluminum alkyl represented by the structural formula $R_n^7AlX_{3-n}$ wherein X is halogen or hydride and $R^7$ is a hydrocarbyl group selected from $C_1$ to $C_{18}$ saturated hydrocarbon radicals and $1 \leq n \leq 3$.

Illustrative of such compounds which can usefully be employed in the treatment step of this invention are $Al(C_2H_5)_3$, $Al(C_2H_5)_2Cl$, $Al(i-C_4H_9)_3$, $Al_2(C_2H_5)_3$, $Al(i-C_4H_9)_2H$, $Al(C_6H_{13})_3$, $Al(C_8H_{17})_3$, $Al(C_2H_5)_2H$. Preferably the organoaluminum compound is an aluminum trialkyl where the alkyl groups can have from 1 to 10 carbon atoms and most preferably from 2 to 8 carbon atoms. Tri-n-hexylaluminum and tri-n-octylaluminum being most preferred.

The treatment of the support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane and cyclohexane; and aromatics such as benzene, toluene, ethylbenzene and xylenes. The amount of solvent to be employed is not critical. Nevertheless, the amount should be employed so as to provide adequate heat transfer away from the catalyst components during reaction and to permit good mixing.

The organometallic component (A) employed either as the organometallic compound or its reaction product with (B) an oxygen-containing compound is preferably added to the inert solvent in the form of a solution. Preferred solvents for the organometallic compositions are the alkanes such as hexane, heptane, octane and the like. However, the same solvent as employed for the slurrying inert particulate support material can be employed for dissolving the organo-metallic composition. The concentration of the organometallic composition in the solvent is not critical and is limited only by handling needs.

The amount of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the magnesium compound concentration is in the range of 0.5 to 2.0 millimoles/g of support and especially 1.0 to 1.8 millimoles/g of support. The magnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen-containing compound and the mode of addition. When the oxygen-containing compound is not pre-mixed with the magnesium compound, that is, when it is added to the support before the magnesium compound or after the magnesium compound, the ratio may range from 0.01 to 2.0. When premixed with the organomagnesium compound, the hydrocarbyl groups on the oxygen-containing compound must be sufficiently large to ensure solubility of the reaction product, otherwise the ratio of oxygen-containing compound to organomagnesium compound ranges from 0.01 to 1.0, most preferably 0.8 to 1.0.

The amount of acyl halide employed should be such as to provide a mole ratio of about 0.1 to about 10 and preferably 0.5 to about 2.5 with respect to the magnesium compound. Preferably the mole ratio will be about 1 to about 2. The transition metal compound is added to the inert support at a concentration of about 0.01 to about 1.5 mmoles Ti/g of dried support, preferably in the range of about 0.05 to about 1.0 mmoles Ti/g of dried support and especially in the range of about 0.1 to 0.8 mmoles Ti/g of dried support. The halogen or interhalogen treatment is such as to provide an excess of the halogen or interhalogen. Generally, the halogen employed, such as, for example, $Cl_2$, is employed in the form of a gas.

The halogen treatment of the catalyst can be accomplished, for example, by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can be used. The molar concentration of $Cl_2$ in the inert gas can range from about 1 mole % to 100 mole %.

The treatment of the solids with the Group IIa, IIb or IIIa metal alkyl can be accomplished, for example, by either adding the Group IIa, IIb or IIIa metal hydrocarbyl to the solid mixture or by slurrying the dried solid mixture in an inert solvent followed by the appropriate quantity of the organometallic treating agent.

The amount of treating agent (F) to be employed should be such as to provide a mole ratio of about 0.5 to about 50 and preferably 1 to about 20 with respect to titanium. Most preferably the mole ratio will be from about 3 to about 10.

Generally, the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the transition metal-containing catalyst component washing after the completion of any step may be effected. However, it is generally found that the material advantages of the catalyst system are diminished by washing until the completion of step (F).

The transition metal-containing catalyst component prepared in accordance with this invention are usefully employed with [the] cocatalysts well known in the art of the Ziegler catalysis for polymerization of olefins. Typically, the cocatalysts which are used together with the transition metal-containing catalyst component are organometallic compounds of Group Ia, IIa, IIb, and IIIa metals such as aluminum alkyls, aluminum alkyl hydrides, lithium aluminum alkyls, zinc alkyls, magnesium alkyls and the like. The cocatalysts desirably used are the organoaluminum compounds. The preferred alkylaluminum compounds are represented by the formula $AlR'''_n X''_{3-n}$ wherein $1 \leq n \leq 3$ and $R'''$ is hydrogen, hydrocarbyl or substituted hydrocarbyl group and $X''$ is halogen. Preferably $R'''$ is an alkyl group having from 2 to 8 carbon atoms. Illustrative examples of the cocatalyst material are ethylaluminum dichloride, ethylaluminum sesquichloride, diethylaluminum chloride, triethylaluminum, tri-n-butylaluminum, diisobutylaluminum hydride, diethylaluminum ethoxide and the like. Aluminum trialkyl compounds are most preferred with triisobutylaluminum being highly desirable.

The catalyst system comprising the alkylaluminum cocatalyst and the transition metal-containing catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce high density polyethylene or linear low density polyethylene by copolymerizing ethylene with other alpha-olefins or diolefins, particularly propylene, butene-1, pentene-1, hexene-1, and octene-1. The olefins can be polymerized in the presence of the catalyst of this invention by any suitable known process such as, for example, suspension, solution and gas-phase polymerization processes.

The polymerization reaction employing catalytic amounts of the above-described catalyst can be carried out under conditions well known in the art of Ziegler polymerization, for example, in an inert diluent at a temperature in the range of 50° C. to 120° C. and a pressure of 1 and 40 atmospheres or in the gas phase at a temperature range of 70° C. to 100° C. at about 1 to about 50 atmospheres and upward. Illustrative of the gas-phase processes are those disclosed in U.S. Pat. Nos. 4,302,565 and 4,302,566 which references are hereby incorporated by reference. As indicated above, one advantageous property of the catalyst system of this invention is the reduced amount of gas phase reactor fouling. The catalyst system can also be used to polymerize olefin at single phase conditions, i.e., 150° C. to 320° C. and 1000–3000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In Examples 1 through 3 and Comparative Example 1, the silica support was prepared by placing Davison Chemical Company G-952 silica gel in a vertical column and fluidizing with an upward flow of $N_2$. The column was heated slowly to 600° C. and held at that temperature for 12 hours after which the silica was cooled to ambient temperature. In Examples 4 through 9 and Comparative Example 2, the silica support was prepared from a microspheroidal silica gel having an average particle size of 45.7 microns as measured by a Leeds and Northrup Microtrac ® instrument, a surface area of 311 $m^2/g$ and a pore volume of 1.59 cc/g. The silica gel was dehydrated for five hours at 800° C. under flowing nitrogen in a manner similar to the G-952 dehydration, after which the silica was cooled to ambient temperatures. In Examples 10 through 13, this silica was dehydrated for five hours at 500° C. under flowing nitrogen. The melt index (MI) and melt index ratio (MIR) were measured in accordance with ASTM Test D1238 (condition E). The resin density was determined by density gradient column according to ASTM Test D1505. The bulk density was determined by allowing approximately 120 cc of resin to fall from the bottom of a polyethylene funnel across a gap of 1 inch into a tared 100 cc plastic cylinder (2.6 cm in diameter by 19.0 cm high). The funnel bottom was covered with a piece of cardboard until the funnel was filled with the sample. The entire sample was then allowed to fall into the cylinder. Without agitating the sample, excess resin was scraped away so that the container was completely filled without excess. The weight of resin in the 100 cc cylinder was determined. This measurement was repeated 3 times and the average value reported.

EXAMPLE 1

Into a vial containing 20 ml of hexane there was injected 10 ml of butylethylmagnesium (BEM) (6.8 mmoles Mg). To the solution was added 0.5 ml (6.8 mmoles) of n-butanol. The mixture was allowed to react at room temperature for 1.5 hours. The solution was added to a vial containing 3.5 g of the Davison silica and reacted with the silica for 1 hour at room temperature. To the reaction mixture was added 6.8 mmoles of benzoyl chloride (BzCl) with stirring. The reaction mixture was stirred at room temperature for 1 hour. To the slurry there was then added 2.3 mmoles of titanium tetrachloride and the slurry mixture was maintained at room temperature for 1 hour. Thereafter the vial was connected to a chlorine gas cylinder and pressured to 7.5 psig and allowed to react for 1 hour at room temperature. The vial was purged with nitrogen and the material contained therein filtered. The solid material was washed 3 times with hexane and vacuum dried. The catalyst was reslurried in 20 ml of hexane and 15 ml of tri-n-octyl-aluminum (25 wt % in hexane, 0.47 mmole Al/ml) was added to obtain a 3 to 1 molar aluminum to titanium ratio. The reaction mixture was maintained at room temperature for 1 hour, filtered, washed 3 times with hexane and dried. Final catalyst contained 1 wt % titanium.

To a 1.8 liter reactor there was added 800 cc of hexane, 0.15 g of the titanium containing catalyst and 1.7 ml of triisobctylaluminum cocatalyst (25 wt % in heptane, 0.9 mmole Al/ml) to provide an aluminum to titanium molar ratio of 50. The vessel was pressured to 30 psig with $H_2$, and then pressured to 300 psig with ethylene. The vessel was heated to 85° C. and polymerization was maintained for 90 minutes. The results are summarized in Table 1.

EXAMPLES 2 AND 3

These examples were run identically as Example 1 with the exception that increased levels of treatment (F) with the aluminum alkyl were employed, the polymerization reactor was pressured to 50 psig with hydrogen and 300 psig total pressure with ethylene and additionally 40 ml of butene-1 was injected into the reactor. The polymerization time was maintained for 40 minutes at 85° C. The amounts of treatment (F) agent and results of the polymerizations are summarized in Table 1.

COMPARATIVE EXAMPLE 1

The catalyst was prepared identically as in Example 1 with the exception that the treatment with tri-n-octylaluminum was omitted. The polmaerization was performed as in Example 1. Results are summarized in Table 1.

In Examples 4 through 7, the reaction product of butyl ethyl magnesium (BEM) and 1-butanol was prepared by placing 50 ml of 9.6% (w/w) BEM in heptane into a clean, dry oxygen-free 125 ml vial containing a stirring bar followed by the slow addition of 2.84 ml of neat dehydrated 1-butanol added at room temperature with constant stirring. The evolved gas was vented through a syringe needle. The colorless solution was stirred for 3 hours at room temperature. 9.16 ml of hexane was added to produce a final concentration of 0.5 mmoles Mg/ml of solution.

EXAMPLE 4

Into a 50 ml vial containing 2 grams of the dehydrated silica gel in 30 ml of hexane was flowed a mixture of 10% chlorine by volume in nitrogen. The chlorine flow was maintained at a rate of 0.014 grams/minute for 40 minutes at ambient temperature while continuously stirring the silica slurry. Excess $Cl_2$ was flushed from the vial at the end of the chlorination by flowing pure $N_2$ at the same flow rate for 5 minutes. To the constantly stirred chlorine treated silica slurry, 6.0 ml of the prepared BEM/butanol solution was slowly added at ambient temperatures. The vial was maintained at ambient temperature and stirred for 1 hour. To the slurry was then added dropwise 2 ml of a 0.5 mmole/ml solution of benzoyl chloride in hexane. Upon completion of the benzoyl chloride addition, the slurry was stirred for 1 hour at ambient temperature. Thereafter 1.2 ml of a 0.5 mmole/ml solution of TiCl$_4$ in hexane was added dropwise to the slurry. The slurry was stirred for 1 hour at ambient temperature. 18.8 ml of a 25.2% (w/w) solution of tri-n-hexyl aluminum in heptane was added dropwise to the slurry and the slurry was stirred for 1 hour. The solid catalyst was recovered by decanting the solvent and washed in 30 ml of fresh hexane for 30 minutes. The titanium-containing solids were recovered by decantation and drying under a stream of nitrogen at room temperature.

To a 1.8 liter polymerization reactor was added 850 ml of hexane, 2.4 ml of 25% (w/w) tri-isobutyl aluminum in heptane. The reaction vessel was pressured to 30 psig with hydrogen and then heated to 85° C. 20 ml of butene-1 was pressured into the reactor with sufficient ethylene to bring the total reactor pressure to 150 psig. 25 mg of the dry titanium-containing solids was injected into the reactor and polymerization was conducted for 60 minutes. The polymerization was ceased by shutting off ethylene flow and rapidly cooling the reactor to room temperature. The results of the polymerization are summarized in Table 2. A comparison of the results in Table II shows that the catalyst in accordance with the invention obtains improved bulk density, a generally narrower molecular weight distribution and a better hydrogen response.

EXAMPLE 5

The titanium-containing catalyst component was prepared as in Example 4 with the exception that 4 ml of benzoyl chloride solution was employed in the preparation of the solid catalyst component. The polymerization of ethylene was performed as in Example 4 with the exception that 100 mg of the solid catalyst component was used in the polymerization. The results of the polymerization are summarized in Table 2.

EXAMPLE 6

The titanium-containing catalyst component was prepared as in Example 4 with the exception that 8 ml of benzoyl chloride solution was employed in the preparation of the solid catalyst component. The polymerization of ethylene was performed as in Example 4 with the exception that 100 mg of the solid catalyst component was used in the polymerization. The results of the polymerization are summarized in Table 2.

EXAMPLE 7

The titanium-containing catalyst component was prepared as in Example 4 with the exception that 8.4 ml of benzoyl chloride solution was employed in the preparation of the solid catalyst component. The polymerization of ethylene was performed as in Example 4 with the exception that 75 mg of the solid catalyst component was used in the polymerization. The results of the polymerization are summarized in Table 2.

COMPARATIVE EXAMPLE 2

The titanium-containing catalyst component was prepared as in Example 4 with the exception that benzoyl chloride addition was not included in the preparation of the solid catalyst component. The polymerization of ethylene was performed as in Example 4 with the exception that 25 mg of the solid catalyst component was used in the polymerization. The results of the polmaerization are sumaarized in Table 2.

EXAMPLE 8

903 g of silica was slurried in 5000 ml of isopentane at 25° .C under a nitrogen blanket. The slurry temperature was raised to 35° C. and the reaction vessel was pressured to 11 psig with chlorine which was flowed into the reactor at a constant flow rate of 1.2 standard liters/minute. The chlorine addition was maintained for 1.25 hours after which no further chlorine uptake was observed. The slurry was stirred for an additional 0.75 hours under a chlorine pressure of 11 psig. The chlorine atmosphere was thereafter removed with nitrogen flow. To the slurry was added 2,050 ml of a reaction mixture of butylethylmagnesium and butanol prepared by pre-reacting 10% BEM in hexane with neat butanol to produce an alcohol/magnesium molar ratio of 0.95 at a concentration of 0.62 mmole mg/ml. The reaction mixture was added over a 29 minute period and thereafter stirred for 2 hours. To the slurry was thereafter added 268 grams of neat benzoyl chloride over a 15 minute period while maintaining the temperature at 35° C. The reaction mixture was then stirred for an additional 45 minutes at which time 51.4 grams of neat TiCl$_4$ was added with stirring at 35° C. over 15 minutes; stirring was continued for 45 minutes. To the slurry was added over a 15 minute period 2,350 ml of a 25% tri-n-hexyl aluminum solution in isopentane. The solution was stirred for an additional 45 minutes while maintaining the reaction vessel at 35° C. The solvent was removed by decantation, the solids washed in 3,000 ml of isopentane, and, finally, recovered by decantation followed by drying for 4 hours at 60° C. under flowing nitrogen.

Gas-Phase Polymerization

A 36-inch diameter fluid bed reactor, operated in a continuous manner, at 82° C. and at a total pressure of 300 psig was employed to produce an ethylene-butene-1 copolymer. A reaction mixture comprising 31.4 mole percent ethylene, sufficient butene-1 and hydrogen to provide a C$_4$H$_8$/C$_2$H$_4$ molar ratio of 0.390 and a H$_2$/C$_2$H$_4$ molar ratio of 0.092 was circulated continuously through the bed at a superficial velocity of 48 cm/sec. The remainder of the reaction mixture was nitrogen. The titanium-containing solid prepared above was continuously pumped at a feed rate of 9.6 g/hr into the reactor and an 11% triethylaluminum in isopentane solution was continuously pumped into the reactor at a feed rate of 511 cc/hr. The production rate was maintained at 76 kg/hr and an average residence time of 5.0 hr. Polymer product formed was removed periodically so as to maintain an essentially constant weight of polymer in the reactor vessel. The results of the polymerization operating at a steady state conditions are set out in Table 3.

EXAMPLE 9

872 grams of silica was slurried in 5,000 ml of isopentane at 25° C. under a nitrogen blanket. The slurry temperature was raised to 35° C. and a 1,980 ml, aliquot of a butylethylmagnesium and butanol reaction product in hexane (prepared by Pre-reacting sufficient 10% butylethylmagnesium in hexane with 1-butanol to produce an alcohol/Mg molar ratio 0.95 at a concentration of 0.62 mmole Mg/ml) was added, with stirring over a 30 minute period. lhe reaction mixture was stirred for two hours. To the reaction mixture was then added 257 grams of neat benzoyl chloride with constant stirring at 35° C. over a 15 minute period, followed by stirring for an additional 45 minutes while maintaining the temperature. Thereafter, 49.8 grams of neat TiCl4 was added over a 15 minute period with constant stirring while maintaining the slurry at 35° C. The mixture was thereafter stirred for one hour while maintaining the temperature at 35° C. at which time chlorine gas was flowed into the slurry at approximately 1.2 standard liters per minute. The pressure in the reactor was kept at 11 psig and excess chlorine was vented as necessary. Chlorine addition was maintained for two hours a which time the atmosphere was replaced with nitrogen. To the chlorine-treated slurry was then added 2,235 ml of 25% tri-n-hexalaluminum in isopentane over a 15 minute period under constant stirring while maintaining the slurry at 35° C. Upon completion of the addition. the reaction mixture was stirred for an additional 45 minutes. The solvent was removed by decantation and the solids washed in 3.000 ml of isopentane. The solids were recovered by decantation followed by drying at 60° C. under a flowing nitrogen stream.

Polymerization was performed as in Example, with the exception that $H_2/C_2H_4$ ratio was 0.135, $C_4H_8/C_2H_4$ ratio was 0.415. The catalyst feed rate was 11.1 g/hr and the aluminum/titanium molar ratio was 22.8, to obtain a resin proouction rate of 63 kg/hr with a residence time of 3.6. The results o& the polymerization are summarized in Table III.

EXAMPLE 10

Into a 50 ml vial containing 2 grams of the 500° C. dehydrated silica gel in 20 ml of hexane was flowed a mixture of 10% chlorine by volume in nitrogen. The chlorine flow was maintained at a rate of 0.014 grams/minute for 40 minutes at ambient temperature while continuously stirring the silica slurry. Excess $Cl_2$ was flushed from the vial at the end of the chlorination by flowing pure $N_2$ at the same flow rate for 5 minutes. To the constantly stirred chlorine treated silica slurry, 8.0 ml of a 0.5 mmole/ml solution of BEM/butanol (1:1) was slowly added at ambient temperatures. The vial was maintained at ambient temperature and stirred for 1 hour. To the slurry was then added dropwise 4.8 ml of a 1.0 mmole/ml solution of benzoyl chloride in hexane. Upon completion of the benzoyl chloride addition, the slurry was stirred for 1 hour at ambient temperature. Thereafter 1.6 ml of a 0.5 mmol/ml solution of TiCl4 in hexane was added dropwise to the slurry. The slurry was stirred for 1 hour at ambient temperature. 3.8 ml of a 0.629 mmole/ml solution of tri-n-hexyl aluminum in hexane/heptane was added dropwise to the slurry and the slurry was stirred for 1 hour. The solid catalyst was recovered by removing the solvent in vacuo.

To a 2.0 liter polymerization reactor was added 850 ml of hexane, 4.2 ml of 25% (w/w) tri-isobutyl aluminum in heptane. The reaction vessel was pressured to 30 psig with hydrogen and then heated to 85° C. 20 ml of butene-1 was pressured in the reactor with sufficient ethylene to bring the total reactor pressure to 150 psig. 75 mg of the dry titanium-containing solids slurried in 3.0%) ml of white oil was injected into the reactor and polymerization was conducted for 40 minutes. The polymerization was ceased by shutting off ethylene flow and rapidly cooling the reactor to room temperature. The results of the polymerization are summarized in Table IV.

EXAMPLE 11

The titanium-containing catalyst component was prepared as in Example 10 with the exception that chlorine was added after the addition of the BEM/butanol solution but prior to the benzoyl chloride treatment. The polmerization of ethylene was performed as in Example 10. The results of the polymerization are summarized in Table IV.

EXAMPLE 12

The titanium-containing catalyst component was prepared as in Example 10 with the exception that chlorine was added after the addition of the benzoyl chloride solution. The polymerization of ethylene was performed as in Example 10. The results of the polymerization are summarized in Table IV.

EXAMPLE 13

The titanium-containing catalyst component was prepared as in Example 10 with the exception that chlorine was added after the addition of the TiCl4 solution. The polymerization of ethylene was performed as in Example 10. The results of the polymerization are summarized in Table IV.

TABLE I

| Example Number | Example | Al/Ti Molar Ratio | Specific Activity[1] | MI (g/10 min) | MIR[2] | Resin Density (g/cc) | Bulk Density (lb/ft$^3$) |
|---|---|---|---|---|---|---|---|
| 1 | $SiO_2$ + (BEM + BuOH) + BzCl + TiCl4 + $Cl_2$ + TNOCTAL | 3 | 2.9 | 1.07 | 28.0 | 0.9555 | 23.1 |
| 2 | $SiO_2$ + (BEM + BuOH) + BzCl + TiCl4 + $Cl_2$ + TNOCTAL | 7 | 3.6 | 0.77 | 26.0 | 0.9445 | 23.1 |
| 3 | $SiO_2$ + (BEM + BuOH) + BzCl + TiCl4 + $Cl_2$ + TNOCTAL | 10 | 3.9 | 0.99 | 25.0 | 0.9428 | 23.1 |
| Comp. 1 | $SiO_2$ + (BEM + BuOH) + BzCl + TiCl4 + $Cl_2$ | 0 | 1.5 | 0.49 | 27.4 | 0.9476 | 21.2 |

BuOH = 1-butanol
BzCl = Benzoyl chloride
TNOCTAL = tri-n-octylaluminum
[1]Units of Specific Activity are KgPE/gTi-hr-atm of ethylene
[2]MIR is the ratio of HLMI to MI as measured by ASTM D1238

TABLE II

| Example Number | Specific Activity[1] | MI (g/10 min) | MIR[2] | Resin Density (g/cc) | Bulk Density (lb/ft$^3$) |
|---|---|---|---|---|---|
| 4 | 45.0 | 1.32 | 29.4 | 0.9420 | 25.0 |
| 5 | 31.2 | 1.87 | 26.0 | 0.9427 | 25.6 |
| 6 | 21.4 | 1.98 | 26.9 | 0.9429 | 25.6 |
| 7 | 11.5 | 1.13 | 26.5 | 0.9447 | 23.7 |
| Comp. 2 | 53.8 | 1.09 | 31.7 | 0.9417 | 12.5 |

[1]Units of Specific Activity are KgPE/gTi-hr-atm of ethylene
[2]MIR is the ratio of HLMI to MI as measured by ASTM D1238 (condition E)

TABLE III

|  | Example 8 | Example 9 |
|---|---|---|
| Productivity (g/g) | 8,000 | 5,700 |
| Resin density (g/cc) | 0.9195 | 0.9190 |
| MI (dg/min) | 1.29 | 0.98 |
| MIR | 30.7 | 33.4 |

TABLE III-continued

|  | Example 8 | Example 9 |
|---|---|---|
| Reactor Bulk Density (lb/ft$^3$) | 24.6 | 20.6 |

TABLE IV

| Example Number | Specific Activity[1] | MI (g/10 min) | MIR[2] | Bulk Density (lb/ft$^3$) |
|---|---|---|---|---|
| 10 | 157.3 | 0.4 | 30 | 19.3 |
| 11 | 272.5 | 0.7 | 34 | 22.5 |
| 12 | 157.9 | 0.7 | 29 | 20.6 |
| 13 | 395 | 0.6 | 24 | 19.3 |

[1]Units of Specific Activity are KgPE/gTi-hr-moles/L of ethylene.
[2]MIR is the ratio of HLMI to MI as measured by ASTM 1238 (Condition E).

What is claimed is:

1. A transition metal-containing catalyst component comprising the solid reaction product obtained by treating silica, alumina, or mixtures thereof in an inert solvent with (A) an organometallic compound represented by the formula $R^1MgR^2$ wherein $R^1$ and $R^2$, which can be the same or different contain 1 to 20 carbon atoms and are selected from alkyl groups, aryl groups, cycloalkyl groups, aralkyl groups, alkadienyl groups or alkenyl groups, (B) an alcohol, (C) an acyl halide, (D) a titanium halide, (E) $Cl_2$, and (F) prereducing the transition metal-containing product with an aluminum alkyl, with the proviso that the (A) and (B) ingredients can be added to the inert solid (i) simultaneously (ii) as the reaction product of (A) and (B), or (iii) treatment with (B) immediately procedes treatment with (A).

2. The transition metal-containing catalyst component of claim 1 wherein the solid reaction product is obtained by treating the inert solid support material in an inert solvent in the orders selected from the group consisting of
   (a) first treating with ingredient (E) followed by sequential treatment with ingredients (A), (B), (C), (D), and (F),
   (b) first treating with ingredients (A) and (B) followed by the sequential treatment with ingredients (C), (D), (E) and (F), or
   (c) first treating with ingredients (B) and (A) followed by the sequential treatment with ingredients (E), (C) (D) and (F) with the further proviso taht the (A) and (B) ingredients can be added (i) simultaneously, (ii) as th reaction product of (A) and (B), or (iii) treatment with (B) immediately prcedes treatment with (A).

3. The transition metal-containing catalyst component of claim 2 wherein the solid reaction product is obtained by treating the inert solid support material in an inert solvent with ingredient (E) followed by sequential treatment with ingredients (A), (B), (C), (D), and (F) and that the (A) and (B) ingredients can be added (i) simultaneously, (ii) as the reaction product of (A) and (B), or (iii) treatment wiht (b) immediately precedes treatment with (A).

4. The transition metal-containing catalyst component of claim 2 wherein the solid reaction product is obtained by treating inert solid support material in an inert solvent with ingredients (A) and (B), followed by sequential treatment with ingredients (C), (D), (E), and (F) and with the further provisio that the (A) and (B) ingredients can be added to the inert solid simultaneously, (ii) as the reaction product of (A) and (B), or (iii) treatment of the inert solid with (B) immediately precedes treatment with (A).

5. The transition metal-containing catalyst component of claim 2 wherein the solid reaction product is obtained by treating the inert solid support material in an inert solvent with ingredients (B) and (A), followed by the sequential treatment with ingredients (E), (C), (D) and (F) and that the (A) and (B) ingredients can be added (i) simultaneously (ii) as the reaction product of (A) and (B), or (iii) treatment with (B) immediately precedes treatment with (A).

6. The transition metal-containing catalyst component of claim 1 wherein the (B) alcohol is represented by the formula $R^3OH$ wherein $R^3$ contains 1 to 20 carbon atoms and can be an alkyl group aryl group, cycloalkyl group, aralkyl group, alkadienyl group or alkenyl group, the (C) acyl halide is represented by the formula $R^6COX$ wherein $R^6$ can be a $C_1$ to $C_{12}$ alkyl group, cycloalkyl group, aryl group or substituted aryl group and X is halogen, and the (F) organometallic compound is an aluminum alkyl represented by $R_n{}^7AlX'_{3-n}$ wherein X' is a halogen or hydride and $R^7$ is a hydrocarbyl group selected from $C_1$ to $C_{18}$ hydrocarbon radicals and $1 \leq n \leq 3$.

7. The transition metal-containing catlayst component of claim 6 wherein $R^1$, $R^2$, $R^3$, $R^6$ and $R^7$ are alkyl or aryl groups having from 1 to 10 carbon atoms.

8. The transition metal-containing catalyst component of claim 1 wherein $R^1$ and $R^2$ are different.

9. The transition metal-containing catalyst component of claim 8 wherein $R^1$, $R^2$ and $R^3$ are alkyl groups having from 1 to 6 carbon atoms.

10. The transition metal-containing catlayst component of claim 9 wherein $R^1$ is butyl.

11. The transition metal-containing catalyst component of claim 10 wherein $R^2$ is ethyl and $R^3$ is butyl.

12. The transition metal-containing catalyst component of claim 6 wherein n is 3 and $R^7$ is an alkyl group containing from 1 to 8 carbon atoms.

13. The transition metal-containing catalyst component of claim 1 wherein the titanium halide is $TiCl_4$.

14. The transistion metal-containing catalyst component of claim 6 wherein $R^6$ is a $C_1$ to $C_{12}$ alkyl group, cycloalkyl group, aryl group or substituted aryl group and X is chlorine.

15. The transition metal-containing catalyst component of claim 14 wherein $R^6$ is an methyl or phenyl group.

16. The transition metal-containing catalyst component of claims 1,2, 3, 4 or 5 in which the (A) organomagnesium compound is ethyl-n-butyl magnesium and the (B) alcohol has from 1 to 4 carbon atoms and (A) and (B) are added as the reaction product.

17. The transition metal-containing catalyst component of claim 6 wherein the aluminum alkyl is a trialkyl aluminum wherein teh alkyl group has from 1 to 10 carbon atoms.

18. The transition metal-containing catlayst component of claim 17 wherein the aluminum alkyl is tri-n-hexyl aluminum.

19. The transition metal-containing component of claims 3, 4, or 5 in which the inert support is silica, the (A) and (B) ingredients are added as the reaction product of n-butyl-ethyl-magnesium and butanol, (C) is benzoyl chloride, (D) is $TiCl_4$, (E) is $Cl_2$ and (F) is tri-n-hexylaluminum.

20. A catalyst system for the polymerization or copolymerization of ethylene and alpha-olefins having from 3 to 12 carbon atoms comprising
(a) an organoaluminum compound of the formula $AlR''_nX''_{3-n}$ wherein R'' is hydrogen, hydrocarbon or substituted hydrocarbon having from 1 to 20 carbon atoms, X is halogen and n is a number from 1 to 3, and
(b) a transition metal-containing catalyst component comprising the solid reaction product obtained by treating silica, alumina and mixtures thereof with -(A) an organometallic compound represented by the formula $R^1MgR^2$ wherein $R^1$ and $R^2$, which can be the same or different contain 1 to 20 carbon atoms and are selective from alkyl group, aryl group, cycloalkyl group, aralkyl group, alkadienyl group or alkenyl group wherein all the metal valencies are satisfied with a hydrocarbyl or substituted, (B) an alcohol, (C) an acyl halide, (D) a titanium halide, (E) $Cl_2$, and (F) prereducing the transition metal-containing product with an aluminum alkyl with the proviso that the (A) and (B) ingredients can be added to the inert solid (i) simultaneously, (ii) as the reaction product of (A), and (B) or (iii) treatment with (B) immediately precedes treatment with (A).

21. The catalyst system of claim 20 wherein the transition metal-containing catalyst component comprises the solid reaction product obtained by treating the inert solid support material in an inert solvent in the orders selected from the group consisting of
(a) first treating with ingredient (E) followed by sequential treatment with ingredients (A), (B) (C), (D), and (F),
(b) first treating with ingredients (A) and (B) followed by the sequential treatment with ingredients (C), (D), (E), and (F), or
(c) first treating with ingredients (B) and (A) followed by the sequential treatment with ingredients (E), (C), (D) and (F) with the further proviso that the (A) and (B) ingredients can be added (i) simultaneously, (ii) as the reaction product of (A) and (B) or (iii) treatment with (B) immediately precedes treatment with (A).

22. The catalyst system of claim 21 wherein the transition metal-containing catlayst compound comprises the solid reaction product obtained by treating the inert solid support material in an inert solvent with ingredient (E) followed by sequential treatment with ingredients (A) and (B), (C), (D), and (F) and that the (A) and (B) yngredients can be added (i) simultaneously (ii) as the reaction product of (A) and (B) or (iii) treatment with (B) immediately prcedes treatment with (A).

23. The catalyst system of claim 21 wherein the transition metal-containing catalyst component comprises the solid reaction product obtained by treating the inert solid support material in an inert solvent with ingredients (A) and (B), followed by the sequential treatment wiht ingredients (C), (D), (E), and (F) and with the further proviso that the (A) and (B) ingredients can be added to the inert solid (i) simultaneously, (ii) as the reaction product of (A) and (B) or (iii) treatment of the inert solid with (B) immediately precedes treatment with (A).

24. The catalyst system of claim 21 wherein the transition metal-containing catalyst component comprises the solid reaction product obtained by treating the inert solid support material in an inert solvent according to order (b).

25. The catalyst system of claim 20 wherein the (B) alcohol is represented by the formula $R^3OH$ wherein $R^3$ a $C_1$ to $C_{20}$ alkyl group, aryl group, cycloalkyl group, aralkyl group, alkadienyl group or alkenyl group, the (C) acyl halide is represented by the formula $R^6COX$ wherein $R^6$ can be a $C_1$ to $C_{12}$ alkyl group, cycloalkyl group, aryl group or substituted aryl group and X is halogen, and the (F) organometallic compound is an aluminum alkyl represented by $R_n^7AlX'_{3-n}$ wherein X' is a halogen, or hydride and $R^7$ is a hydrocarbyl group selected from $C_1$ to $C_{18}$ saturated hydrocarbon radicals and $1 \leq n \leq 3$.

26. The catalyst system of claim 25 wherein $R^1$, $R^2$, $R^3$, $R^6$ and $R^7$ are alkyl or aryl groups having from 1 to 10 carbon atoms.

27. The catalyst system of claim 20 wherein $R^1$ and $R^2$ are different.

28. The catalyst system of claim 27 wherein $R^1$, $R^2$ and $R^3$ are alkyl groups having from 1 to 6 carbon atoms.

29. The catalyst system of claim 28 wherein $R^1$ is butyl.

30. The catalyst system of claim 29 wherein $R^2$ is ethyl and $R^3$ is butyl.

31. The catalyst system of claim 25 wherein n is 3 and $R^7$ is an alkyl group containing from 1 to 8 carbon atoms.

32. The catalyst system of claim 20 wherein the titanium halide is $TiCl_4$.

33. The catalyst system of claim 20, 21, 22, 23 or 24 in which the (A) organomagnesium compound is ehthyl-n-bytyl-magnesium the (B) alcohol has from 1 to 4 carbon atoms and (A) and (B) are reacted together.

34. 1 The catalyst system of claim 20 wherein the aluminum alkyl is a trialkyl aluminum wherein the alkyl group has from 1 to 10 carbon atoms.

35. The catlayst system of claim 25 wherein the aluminum akyl is tri-n-hexyl aluminum.

36. The catalyst system of claims 22, 23, or 24 in which the inert support is silica, the (A) and (B) ingredients are added as the reaction product of n-butyl-ethyl-magnesium and butanol, (C) is benzoyl chloride, (D) is $TiCl_4$, (E) is $Cl_2$, and (F) is tri-n-hexyl-aluminun.

* * * * *